United States Patent [19]

Grossman et al.

[11] 3,997,465

[45] * Dec. 14, 1976

[54] DEHALOGENATION PROCESS

[75] Inventors: Leonard N. Grossman, Wrightsville Beach, N.C.; Donald A. Brigham, Anderson, Calif.

[73] Assignee: General Electric Company, San Jose, Calif.

[ * ] Notice: The portion of the term of this patent subsequent to Aug. 28, 1990, has been disclaimed.

[22] Filed: July 23, 1973

[21] Appl. No.: 381,875

Related U.S. Application Data

[63] Continuation-in-part of Ser. No. 55,744, July 12, 1970, Pat. No. 3,755,188.

[52] U.S. Cl. .................. 252/301.1 R; 423/19; 423/59; 423/75; 423/261; 423/325
[51] Int. Cl.² ........................................... G21C 19/42
[58] Field of Search ............. 252/301.1 R; 423/261, 423/68, 19, 59, 75, 325

[56] References Cited

UNITED STATES PATENTS

| | | | |
|---|---|---|---|
| 3,000,703 | 9/1961 | Brugger | 423/608 |
| 3,235,327 | 2/1966 | Blundell et al. | 423/261 |
| 3,333,930 | 8/1967 | Grant et al. | 423/253 |
| 3,420,619 | 1/1969 | Booker et al. | 423/608 X |
| 3,481,693 | 12/1969 | Skrivan | 423/613 |
| 3,547,598 | 12/1970 | Knudsen | 423/261 |
| 3,755,188 | 8/1973 | Grossman et al. | 252/301.1 R |
| 3,786,120 | 1/1974 | De Hollander et al. | 264/.5 |
| 3,796,672 | 3/1974 | Dada et al. | 252/301.1 R |
| 3,808,145 | 4/1974 | Packard et al. | 252/301.1 R |

FOREIGN PATENTS OR APPLICATIONS 2,100,296   3/1972   France

*Primary Examiner*—Richard E. Schafer
*Attorney, Agent, or Firm*—Ivor J. James, Jr.; Sam E. Laub; Samuel E. Turner

[57] ABSTRACT

Process for dehalogenation of particulate compositions containing halide impurities including metallic oxides and metallic halides such as metallic fluorides to produce metallic oxides by contacting the compositions in a heated atmosphere containing vaporized alcohol. A second gas including inert gases and active dehalogenating gases can be mixed with the vaporized alcohol. A preferred practice has agitation of the particulate compositions containing halide impurities during the dehalogenation process. The metallic oxide produced by dehalogenation can be freed from any hydrocarbon residues where desired by a subsequent heating step in a reducing atmosphere. The halide ions from the dehalogenation can be recovered as an acid by passing the dehalogenation atmosphere through water. A preferred practice of this invention uses propyl alcohol as no hydrocarbon residues are found in the dehalogenated powder.

12 Claims, 1 Drawing Figure

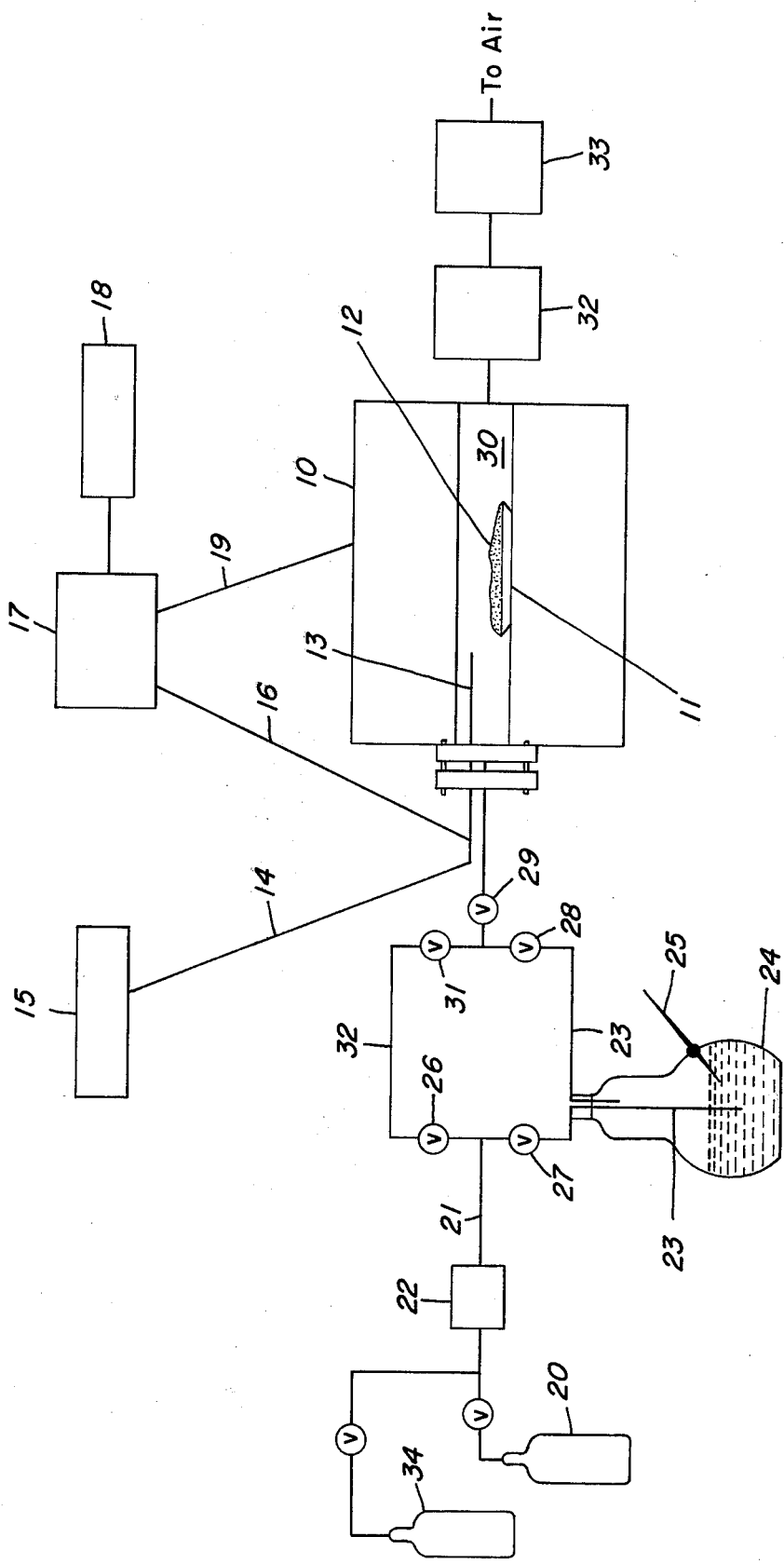

DEHALOGENATION PROCESS

CROSS REFERENCE TO RELATED APPLICATION

This application is a continuation-in-part of copending U.S. patent application Ser. No. 55,744, now U.S. Pat. No. 3,755,188 filed July 12, 1970.

BACKGROUND OF THE INVENTION

Metallic oxides (ceramics) have been prepared in the past from metallic halides by reacting the metallic halides with water to hydrolize the metallic halide and form a water solution of the metallic halide and an acid. One prior art practice has been to convert the resulting metallic oxyhalide to the desired metallic oxide by heating in a reducing atmosphere for dehalogenation.

One specific process particularly important in the production of enriched uranium dioxide is conventionally carried out by a gas phase diffusion process involving halides of uranium so that it is necessary to convert the uranium halide to oxide. Current practice for converting uranium hexafluoride to uranium dioxide, for example, employs hydrolysis of uranium hexafluoride to give a solution of uranyl fluoride and hydrogen fluoride from which ammonium diuranate is precipitated by addition of ammonia. After filtration, the ammonium diuranate of high fluoride ion content is dissolved in nitric acid with fluoride decontamination of the resulting uranyl nitrate solution being accomplished by solvent extraction. From the resulting purified uranyl nitrate solution, ammonium diuranate is reprecipitated and then calcined to give $U_3O_8$ which in turn is reduced with hydrogen to give uranium dioxide with a high fluoride ion concentration, the fluoride ions often being combined with the $UO_2$ to give uranyl fluoride ($UO_2F_2$).

A process of dehalogenation of metallic oxyhalides utilizes heated atmospheres of hydrogen passed over a bed of the metallic oxyhalide. To dehalogenate a metallic oxyhalide such as uranium oxyfluoride one needs, when using hydrogen, a temperature in excess of about 2000° F to have a practical rate of dehalogenation. Such a temperature produces undesirable properties in the resulting ceramic including the loss of the ability to make dense compacted ceramic bodies from the resulting powder due to a deadening of the powder (loss of surface area of the powder) at the temperature required for the dehalogenation process. In order to lower the temperature for conducting successful dehalogenation of metallic oxyhalides a wet hydrogen atmosphere has been used which has the effect of increasing the rate of dehalogenation at any given temperature when compared to the use of dry hydrogen. This also has a practical effect of lowering the temperature needed to achieve a practical rate of dehalogenation of a metallic oxyhalide. The dehalogenation process using wet hydrogen gives economies of operation and an increased powder activity in that there is greater ability of the powder to be compacted and sintered to dense structures.

Improved methods for the conversion of a uranium halide such as uranium hexafluoride to uranium oxide by gas phase reaction of uranium hexafluoride are described in copending U.S. patent application Ser. No. 77,446, now U.S. Pat. No. 3,796,672, entitled "Process for Producing Uranium Dioxide Rich Compositions from Uranium Hexafluoride", filed Oct. 2, 1970 in the names of W. R. DeHollander and A. G. Dada and assigned to the same assignee as the present invention. Briefly this process can be summarized as a method of preparing a uranium dioxide rich composition from uranium hexafluoride in a reactor defining a reaction zone in the presence of an active flame comprising the steps of:

a. introducing a first gaseous reactant comprising a mixture of uranium hexafluoride and an oxygen-containing carrier gas into the reaction zone, b. separately introducing a second gaseous reactant comprising a reducing gas into the reaction zone, and c. separately introducing a shielding gas into the reaction zone between the first gaseous reactant and the second gaseous reactant which temporarily prevents substantial mixing and reaction between the first and second gaseous reactants until sufficient cross diffusion of the reactants occurs as the reactants pass through the reaction zone.

Another process is described in copending U.S. patent application Ser. No. 131,685, now U.S. Pat. No. 3,790,493 entitled "Post Oxidation Process for Uranium Dioxide Rich Compositions", filed Apr. 6, 1971 in the names of A. G. Dada, W. R. DeHollander and R. J. Sloat and assigned to the same assignee as the present invention. Briefly this process can be summarized as a method of preparing a uranium oxide rich composition from uranium hexafluoride in a reaction zone in the presence of an active flame comprising the steps of:

a. introducing a first gaseous reactant comprising a mixture of uranium hexafluoride and an oxygen-containing carrier gas into the reaction zone, b. separately introducing a second gaseous reactant comprising a reducing gas into the reaction zone, c. separately introducing a shielding gas into the reaction zone between the first and second gaseous reactants which temporarily prevents substantial mixing and reaction between the first and second gaseous reactants until sufficient cross diffusion of the reactants occurs as the reactants pass through the reaction zone, and d. introducing a third gaseous reactant comprising an oxygen-containing gas into contact with the particulate uranium dioxide rich composition and the residual reducing gas thereby converting the residual reducing gas in the reaction zone to an oxidized form and oxidizing the uranium dioxide rich composition to a higher oxide of uranium.

The powder produced in the practice of the process of U.S. Pat. No. 3,796,672 is largely uranium dioxide or precursors of uranium dioxide with the balance being largely fluoride impurities and including some $UF_4$, $U_3O_8$, $U_4O_9$, $UO_2F_2$ and mixtures thereof. The powder produced in the practice of the process of U.S. Pat. No. 3,790,493 is largely uranium oxides ($U_3O_8$, $U_2O_5$, $U_4O_9$ and mixtures thereof with or without some $UO_2$) or precursors of uranium oxides with the balance being largely fluoride ions in the form of hydrogen fluoride and other compounds containing uranium and fluorine believed to include $UF_4$, $UF_6$, $UO_2F$, $UO_2F_2$, and mixtures thereof.

Accordingly it is desirable to use a low temperature process for achieving a practical, rapid rate of dehalogenating compositions such as uranium oxide compositions containing halide impurities including metallic halide impurities such as uranium fluorides and uranium oxyfluorides. The lower temperature dehalogenation process will enable treatment of uranium oxide powders produced by gas phase conversion so that these powders have even greater powder activity, greater economies of operation and more dense structures after the powders are compacted and sintered.

SUMMARY OF THE INVENTION

Enhanced dehalogenation rates of compositions containing halide impurities have been achieved using an atmosphere containing vaporized alcohol at a lower temperature range for successful dehalogenation of these compositions than practiced in the prior art.

It is an object of this invention to obtain a rapid dehalogenation of the compositions containing halide impurities at lower temperatures than practiced in the prior art to produce a ceramic powder having a high surface area.

It is a further object of the present invention to utilize vaporized alcohol atmospheres with or without a second gas in dehalogenation of compositions containing halide impurities.

A particularly preferred object of the present invention is defluorination of metallic oxides, especially uranium oxides, by vaporized alcohol atmospheres with or without a second gas in a heated reaction zone.

Other objects and advantages of this invention will become apparent to a person skilled in the art from a reading of the following specification with reference to the attached Figure and from the appended claims.

BRIEF DESCRIPTION OF THE DRAWING

The attached FIGURE presents in schematic form a process utilizing vaporized alcohol containing atmospheres with or without a carrier gas in a heated furnace to dehalogenate compositions containing halide impurities.

DETAILED DESCRIPTION OF THE INVENTION

It has now been discovered that compositions containing halide impurities can be successfully and rapidly dehalogenated at temperatures preferably under about 1600° F in an atmosphere containing vaporized alcohol. The rate of dehalogenation achieved with the vaporized alcohol containing atmospheres is equivalent to prior art practices utilizing wet hydrogen at temperatures greater than 1600° F which involved loss of surface area (deadening) of the dehalogenated powder. This surprising discovery enables realization of enhanced quality in dehalogenation of metallic oxide compositions containing halide impurities and enables production of metallic oxide powders having increased surface area. The process of this invention produces more active metallic oxide powders because there has been no appreciable loss of surface area during dehalogenation.

As used in this specification the term halide includes the nonmetallic elements in combined form of the seventh group of the periodic system—fluoride, chloride, bromide and iodide ions. The halide component can include a mixture of the foregoing ions and can include oxyhalides. The metallic ions combined with the halide or oxyhalide can be one species or mixtures of several species with representative mixtures including uranium with plutonium, gadolinium, iron, etc. Representative halides dehalogenated in the practice of this invention include $UF_4$, $UF_6$, HF, solid solutions of either $UF_4$ or $UF_6$ or both in uranium oxides, $PuF_4$, $PuF_2$, $(U, Pu)F_4$, $(U, Pu)F_2$, solid solutions of $(U, Pu)F_4$ in a mixture of uranium oxide and plutonium oxide, $TiCl_4$, $ZrCl_4$, $SiCl_4$, $WCl_4$, $WF_4$, $GdCl_3$, $AlCl_3$, $AlF_3$ and $WCl_2F_2$. Representative metallic oxyhalides dehalogenated in the practice of this invention include $UO_2F_2$, $UO_2F$, $UOF_2$, solid solutions of $UOF_2$ in $UO_2$, solid solutions of $UO_2F_2$ in $U_3O_8$, $PuOF_2$, PuOF, $(U, Pu)O_2F_2$, solid solutions of $(U,Pu)O_2F_2$ in a mixture of uranium dioxide and plutonium oxide, $TiOCl_2$, $ZrOCl_2$, GdOCl, $SiOCl_2$, $WOF_2$, AlOCl, AlOF and WOClF.

The compositions containing halide impurities can include one or more other components such as ceramics including the uranium oxides, especially uranium dioxide, plutonium oxide, gadolinium oxide, silicon dioxide, titanium dioxide, a mixture of uranium dioxide with one or more ceramics such as plutonium oxide and gadolinium oxide, etc.

The gaseous alcohol-containing atmospheres can include one or more vaporized aliphatic alcohols of the general formula $C_nH_{2n}HOH$ where $n$ is an integer from 1 to 10 inclusive including as representative methanol ($CH_3OH$), ethanol ($C_2H_5OH$), n-propyl ($CH_3CH_2CH_2OH$), isopropyl ($CH_3CHOHCH_3$), n-butyl[$CH_3(CH_2)_2CH_2OH$], sec-butyl ($CH_3CH_2CHOHCH_3$), tert-butyl[$(CH_3)_3COH$], n-pentyl [$CH_3(CH_2)_3CH_2OH$], isopentyl [$(CH_3)_2CHCH_2CH_2OH$], tert-pentyl [$CH_3CH_2C(OH)(CH_3)_2$], n-hexyl [$CH_3(CH_2)_4CH_2OH$], n-heptyl [$CH_3(CH_2)_5CH_2OH$], n-octyl[$CH_3(CH_2)_6CH_2OH$], n-nonyl[$CH_3(CH_2)_7CH_2OH$] and n-decyl [$CH_3(CH_2)_8CH_2OH$]. While the cost is higher, other alcohols where $n$ is greater than 10 can be utilized and other compounds containing a hydroxyl group such as the aromatic alcohols can be employed.

The alcohol-containing atmospheres can also include additional gaseous components (as used herein "second gas") either serving as a carrier for the alcohol with the carrier being non-reactive with the composition being dehalogenated and inert to the dehalogenation reaction or serving as an active dehalogenation carrier in the atmosphere. Representative of the carriers inert to the dehalogenation reaction are nitrogen, helium, neon, argon, krypton, xenon and mixtures of the foregoing. Representative of the active dehalogenation components mixed with the vaporized alcohol are reducing gases such as dry hydrogen, wet hydrogen, dissociated ammonia and mixtures of the foregoing. It is also contemplated in this invention that mixtures of the foregoing non-reactive carriers and active dehalogenation carriers can be utilized in this invention with the vaporized alcohol such as a mixture with vaporized alcohol of nitrogen and hydrogen or argon and dissociated ammonia.

While any temperature achieving dehalogenation can be employed by utilizing heated furnaces receiving the alcohol-containing atmosphere, the temperature is generally under about 1600° F and preferably under about 1100° F where it is desired to have a powder of high surface area with the range of temperature being about 600° to about 1600° F and a preferred range of temperature being about 600° to about 1100° F. This range gives a rapid rate of dehalogenation while preserving high surface area of the dehalogenated powder. In general the higher the temperature used the greater the rate of dehalogenation achieved with greater hydrocarbon impurity content of the dehalogenation powder. The lower temperatures in the foregoing range give the highest surface areas for the defluorinated powder. Where the atmosphere used in the furnace contains only vaporized alcohol, a higher temperature up to about 1600° F can be utilized for the dehalogenation step without loss of activity of the dehalogenated powder with a particularly preferred range of temperature being about 1200° to about 1600° F. Again the rate of dehalogenation and the surface area of the dehalogenated powder vary with the particular temperature in the foregoing range as noted above.

If it is particularly desirable to avoid any loss of surface area of the powder being dehalogenated, a preliminary step is dehydrating the powder to a moisture content of less than about $10^{15}$ molecules of water per square centimeter of surface area (or less than about 3 × $10^{-8}$ grams per square centimeter) before dehalogenation. The drying step can be practiced by heating the powder in the temperature range of about 200° to about 750° F for about 15 minutes to about 5 hours under a dry atmosphere such as a vacuum, nitrogen, helium, neon, hydrogen, dissociated ammonia, argon, air, oxygen and mixtures of the foregoing. Agitation of the powder during dehydration is desirable.

To accomplish dehalogenation, the powder may be either placed in a cold furnace and brought to the temperature range presented above under the alcohol-containing atmosphere or the powder may be drawn in a container through a furnace maintained in the above temperature range under the alcohol-containing atmosphere. If the resulting powder is to be free of hydrocarbon residues, a subsequent dealcoholation heating step in the range of 1250° to 1650° F is practiced in an atmosphere free of alcohol vapors such as a reducing atmosphere of hydrogen, wet hydrogen, dissociated ammonia or mixtures thereof. This subsequent step is referred to hereinafter as dealcoholation of the dehalogenated powder.

The powders have been successfully dehalogenated in static beds using controlled atmosphere furnaces. The rate of dehalogenation is increased where the powder is agitated during the time it is in the furnace with representative practice being to use a rotating bed furnace to uniformly agitate the composition containing the metallic oxyhalide to be dehalogenated.

Where the atmosphere maintained in the furnace contains only alcohol without a second gas, the alcohol is vaporized by heating a reservoir of alcohol so that a rate of flow of the alcohol vapor is sufficient to maintain a fresh dehalogenating atmosphere in the furnace. Where a second gas is mixed with the alcohol vapor such as an inert gas of nitrogen, helium, air, oxygen, neon, argon, krypton, xenon or mixtures thereof, or a reducing gas such as dry hydrogen, wet hydrogen, dissociated ammonia or mixtures thereof, the second gas is mixed with the alcohol such as by bubbling through the alcohol at ambient temperature and then introduced to the furnace. Representative partial pressures for the alcohol vapor in the furnace when mixed with a second gas are in the range of about 10 to about 80 torr, preferably about 20 to about 60 torr, depending on the particular alcohol being employed and the second gas pressure is about one atmosphere. For example, where mathanol is used, the alcohol pressure is maintained at about 60 torr and where isopropanol is used the alcohol pressure is maintained at about 20 torr. The alcohol pressure in the furnace can be increased or decreased by heating or cooling the alcohol reservoir. The alcohol pressure maintained in the dehalogenating system is not critical to the practice of the process. Where only alcohol vapor is used as the furnace atmosphere, the alcohol pressure in the furnace is about one atmosphere.

The amount of alcohol used to conduct the dehalogenation reaction in practice is about 3 to about 7 moles, preferably about 5 moles, of alcohol per mole of halide ion. The amount of excess alcohol in the dehalogenation system is related to the degree of agitation of the powder and may be reduced through use of powder agitation.

The alcohols employed in the practice of this invention are reagent grade alcohols from low impurity bottled sources (less than 0.5 percent by weight impurities). The second gas (inert gases or active gases) generally contains less than 100 parts per million of all impurities.

Referring now to the Figure, there is shown a furnace 10 such as an inductively heated furnace having a sample boat 11 holding a powder 12 containing halide impurities. The temperature of the furnace is determined by sheathed thermocouple 13 with thermocouple leads 14 being connected to potentiometer 15 and thermocouple leads 16 being connected to temperature indicator 17 and variable power source 18. Indicator 17 controls the amount of power from power source 18 being transmitted in line 19 to furnace 10. A second gas such as from cylinder 20 or cylinder 34 or from both cylinders is fed through line 21 as controlled by flow meter 22 through line 23 to an alcohol vapor generator 24 when valves 26 and 31 are closed and valves 27 and 28 are open. The alcohol vapor generator 24 can be a heated or an unheated reservoir of alcohol and this arrangement produces a mixture of alcohol and the second gas. The temperature of the alcohol is shown by thermometer 25. The second gas can be an inert gas or hydrogen, wet hydrogen, dissociated ammonia or a mixture of the foregoing. In practice one cylinder 34 could be an active dehalogenation carrier such as hydrogen and the other cylinder 20 could be a non-reactive carrier such as argon. Where only the second gas is to be circulated to the furnace chamber 30, valves 27 and 28 are closed while valves 26 and 31 are open. This arrangement is used where the halide impurity-containing powder is dehydrated before being dehalogenated. An additional valve 29 can be used to prevent air from entering the furnace when line 21 is open (e.g., to add a new cylinder 20 or a new cylinder 34 to the line). The gases coming off the furnace are passed through halide gas recovery unit 32 and hydrogen burner 33 and then released to air.

The processes practiced in this invention will be discussed with reference to the Figure. Where a preliminary drying or dehydration of the powder is desired, the boat 11 holding the powder 12 is placed in the furnace and valves 27 and 28 are closed with valves 26 and 31 being in an open position. A source of gas such as from cylinder 20 or cylinder 34 or both is metered into line 21 through flow meter 22. The gas goes through line 32 to furnace 10 which is heated to a temperature in the range of about 200° to about 750° F. This drying step is performed for about 15 minutes to about 5 hours depending on the batch size and this step preserves the surface area of the powder so that it can be sintered to very dense structures.

When the drying step is completed or if no drying step is deemed necessary, the valves 26 and 31 are closed with valves 27, 28 and 29 open and a second gas such as from cylinder 20 or cylinder 34 or both cylinders is fed through line 21 to flow meter 22, into line 23 to alcohol vapor generator 24 and then to furnace chamber 30. The furnace is maintained at the desired dehalogenation temperature in the range of about 600° to about 1600° F. The alcohol vapor generator 24 is maintained at a temperature in the range of about 50° to about 75° F to give a nearly saturated alcohol atmosphere introduced in the furnace. The gas is passed to the furnace until the halide ion concentration is removed from the powder 12 which in practice has taken about 1 to about 15 hours, depending on the batch size and whether the powder is agitated.

Where only alcohol vapor without a second gas is to be introduced to the furnace chamber 30, gas cylinders 20 and 34 are turned off and valves 26, 27 and 31 are turned off while valves 28 and 29 are left open. The furnace 10 is heated to a temperature in the range of about 1200° to about 1600° F. The alcohol vapor generator is heated to a temperature in the range of about 150° to about 250° F to give a desired flow rate of alcohol to the furnace in the range of about 1 to about 10 cubic feet per hour.

If ceramic specifications require a metallic oxide free of hydrocarbon residues, gas source from cylinder 34 which can be a reducing gas such as hydrogen or dissociated ammonia is passed through line 32 to the furnace 10 with valves 27 and 28 being closed and valves 26, 29 and 31 being open. The furnace 10 is maintained at a temperature in the range of about 1250° to about 1650° F for up to about 60 minutes to assure removal of hydrocarbon residues from the ceramic compositions. A stoichiometric oxide product, for example, for a uranium dioxide product in which the ratio of oxygen atoms to metal atoms is substantially 2.00:1, may be produced or maintained during cooling of the dehalogenated oxide product when a gas source such as 20 is a reducing atmosphere. Such an atmosphere may consist of hydrogen in the case of uranium oxides. In a preferred practice of this invention, propyl alcohol is employed as the vaporized alcohol as no hydrocarbon residues are found on the dehalogenated powder.

The following example is offered to show a representative process of the disclosed invention as carried out to dehalogenate compositions containing halide impurities. The following example is offered to be representative of the teaching of this process and in no way serves to limit the teaching of this invention.

EXAMPLE 1

25 grams of uranium oxide powder produced according to the process of U.S. Pat. No. 3,796,672 are placed into a type 304 stainless steel boat for defluorination in a static bed, controlled atmosphere furnace having a type 304 stainless steel muffle with a diameter of 1½ inches. The furnace and arrangement of gases are similar to that shown in the Figure with the furnace having Varian Conflat flanges welded onto the ends. The carrier gas for the alcohol is bottled hydrogen and the gas lines are arranged so hydrogen can bypass the alcohol vapor generator which was maintained at 50° ± 5° F for the entire time alcohol vapor was introduced to the furnace. Furnace temperatures were measured with a stainless steel clad chromelalumel thermocouple located inside the furnace muffle directly above the powder. The gas exiting from the furnace is directed through a potassium hydroxide titration apparatus, then into a mass spectrometer and a liquid nitrogen cooled cold trap. The gas effluent from the cold trap is then burned in air.

The powder used in this Example was subjected to various tests to determine the structure and the nature of the impurities. Leaching of the powder in water extracts the water soluble uranium and fluoride constituents and suggests the presence of $UO_2F_2$ in this compound. Scanning electron microscopy has yielded the particle size, particle shape and the relation of one particle to adjacent particles. Mass spectrographic analysis has yielded the particular metallic ions present in the powder, primarily the isotopes of uranium. Titration of the free acid leached from the powder in a water solution has indicated the presence of hydrogen fluoride. X-ray diffraction has shown trace lines of various compounds including $UO_2$, $UO_3$, $U_4O_9$, the presence of a uranium oxyfluoride and faint indications of $UF_4$ and $UF_6$. Determination of the oxygen-to-uranium ratio before and after leaching with water has identified the presence of various compounds including $UO_2$, $UO_2F_2$, $UF_4$, $UO_3$ and $U_4O_9$. The powder was found to contain 3.9 weight percent fluoride.

The furnace is heated over a period of 30 minutes to 370° F while hydrogen is passed through the furnace to dehydrate the powder. The furnace is next heated over a period of 10 minutes to 770° F and hydrogen is bubbled through the alcohol vapor generator containing methanol (which is maintained at 50° ± 5° F) for 3 hours to defluorinate the powder. The furnace is heated to 1290° F for ⅓ of an hour while receiving only hydrogen to remove hydrocarbon residues from the powder. The sample is cooled in the furnace under the hydrogen atmosphere and removed from the furnace. The resulting powder was uranium dioxide having a surface area of 10.2 square meters per gram and a fluoride ion content under 150 parts per million. Surface area was measured by the standard practice of nitrogen absorption (Brunauer-Emmett-Teller technique).

As will be apparent to those skilled in the art, various modifications and changes may be made in the method described herein. It is accordingly the intention that the invention be construed in the broadest manner within the spirit and scope as set forth in the accompanying claims.

What is claimed is:

1. A method of dehalogenating a composition selected from the group consisting of metallic halides and metallic oxides having halide impurities, oxyhalide impurities and mixtures of halide and oxyhalide impurities, wherein the metallic portion of said metallic halides and metallic oxides is selected from the group consisting of uranium, plutonium, mixtures and solid solutions of uranium and plutonium, titanium, zirconium, silicon, tungsten, gadolinium, aluminum and mixtures thereof, comprising the step of heating the composition at a temperature in the range of about 600° F to about 1600° F in a dehalogenation atmosphere comprising a vaporized alcohol.

2. A method according to claim 1 where the controlled atmosphere includes a carrier gas.

3. A method according to claim 2 where the carrier gas is inert with respect to the dehalogenation reaction and is selected from the group consisting of nitrogen, helium, neon, argon, krypton, xenon and mixtures of the foregoing.

4. A method according to claim 2 where the carrier gas is active with respect to the dehalogenation reaction and is selected from the group consisting of hydrogen, wet hydrogen, dissociated ammonia and mixtures of the foregoing.

5. A method according to claim 2 where the temperature is maintained in the range of about 600° to about 1100° F.

6. A method according to claim 1 where the controlled atmosphere consists essentially of vaporized alcohol and the temperature is in the range of about 1200° to about 1600° F.

7. A method according to claim 1 in which is practiced the preliminary step of dehydrating the composition having fluoride impurities at a temperature in the range of about 200° to about 750° F.

8. A method according to claim 1 where a subsequent dealcoholation step is practiced on the dehalogenated composition comprising heating the composition in the range of about 1250° to about 1650° F in an atmosphere selected from the group consisting of hydrogen, wet hydrogen, dissociated ammonia and mixtures thereof.

9. A method according to claim 1 in which the composition is agitated during heating.

10. A method according to claim 1 in which the halide ions removed from the composition are recovered as an acid by passing the dehalogenation atmosphere withdrawn from the furnace through water.

11. A method according to claim 1 in which the alcohol is propyl alcohol.

12. A method according to claim 1 in which the alcohol is methanol.

* * * * *